United States Patent
Hassan

(10) Patent No.: US 7,113,361 B2
(45) Date of Patent: Sep. 26, 2006

(54) RETRACT METHOD TO REDUCE HEAD FRICTION WITH THE DISK FOR A HARD DISK DRIVE

(75) Inventor: Mehedi Hassan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 19 days.

(21) Appl. No.: 10/680,933

(22) Filed: Oct. 8, 2003

(65) Prior Publication Data
US 2005/0078400 A1   Apr. 14, 2005

(51) Int. Cl.
*G11B 21/02* (2006.01)
(52) U.S. Cl. .............................. 360/75; 318/362
(58) Field of Classification Search ............. 360/75, 360/78.04; 318/280, 368, 632, 364
See application file for complete search history.

(56) References Cited

U.S. PATENT DOCUMENTS 6,140,784 A * 10/2000 Mazda .................. 318/280
6,157,509 A * 12/2000 Ratliff .................. 360/75
6,721,119 B1 * 4/2004 Hassan et al. .......... 360/75

* cited by examiner

*Primary Examiner*—Andrew L. Sniezek
(74) *Attorney, Agent, or Firm*—W. James Brady, III; Frederick J. Telecky, Jr.

(57) ABSTRACT

An apparatus, method and system for retracting a read/write head (13) to a landing position of a disk (11) in a disk drive system (10) which includes an actuator (33) coupled with the head (13) for retracting in a first direction toward an outside diameter of the disk (11) and a second direction toward an inside diameter of the disk (11) in response to corresponding signals. A control device (32) coupled with the actuator (33) which is adapted for determining a retract direction for the read/write head (13), wherein a first signal indicative of a first direction and a second signal indicative of a second direction is provided to the actuator (33), the control device (32) further providing the first signal following a loss of power which energizes the disk drive motor (38) of the disk drive system and providing the second signal subsequent to providing the first signal for retracting the read/write head (13) to the landing position.

11 Claims, 1 Drawing Sheet

RETRACT METHOD TO REDUCE HEAD FRICTION WITH THE DISK FOR A HARD DISK DRIVE

FIELD OF THE INVENTION

The present invention relates to hard disk drives and, more particularly, to improvements in methods and apparatuses for retracting the read/write head.

BACKGROUND OF THE INVENTION

Conventional magnetic storage devices generally include a magnetic transducer head suspended in close proximity to a recording medium, such as a magnetic disk having a plurality of concentric tracks. The storage device also includes a spindle motor for rotating the disk and a head stack assembly that can include one or more read/write heads. The head stack assembly is controllably positioned over the magnetic disk by an actuator or a servo system in order to read or write information from or to particular tracks on the disk.

When the disk is at rest, the heads normally ride just resting on the disk; however, when the disk is spinning, air forces generated between the disk and the heads cause the heads to float a small distance above the magnetic media.

Two of the most critical periods in determining the read/write head life span occur during take off and landing. Prior to operation, the read/write head rests on an inner track or landing zone where the head is parked. As the disk begins to rotate from an initial, stopped position, the read/write head is dragged along the surface of the disk. Once the disk reaches sufficient speed, the aerodynamic lift floats the read/write head assembly away from the disk surface.

During shutdown of the disk drive system, the disk drive spindle motor slows and the air forces begin to stop, allowing the heads to fall into contact with the magnetic media. If the heads come into contact with the media while there is still some movement of the media, wear or damage may result, both to the recorded area on the media and to the heads.

Consequently, means have been proposed to position the heads over a "landing strip" portion of the disk, so that only that strip is damaged by a head falling onto the disk. This landing strip is typically along the inner diameter (ID) of the magnetic disk surface. In the event of a loss of power, to prevent the heads from landing on portions of the magnetic media other than the ID, often when a power failure is detected, the motor spinning the disk is allowed to continue to turn under the inertia of the various masses of the drive. As a result, the spindle motor coils generate their own back-emf. The coils of the spinning motor are then connected to deliver the voltages generated by the back-emf produced in the motor windings to operate retract control circuitry and to provide the energy to the voice coils necessary to drive the heads to the landing strip. Once the head is retracted to the ID and the air forces stop, the head falls and contacts the disk surface, the head is dragged across the ID surface as the motor's momentum continues the magnetic disk rotation for a period before a brake is finally applied to totally stop the motor. Power failure detection, back-emf utilization, head retract circuitry, and motor braking are known in the art.

SUMMARY

The present invention achieves technical advantages as an apparatus, method and system for retracting a read/write head to a landing position of a disk in a disk drive system which includes an actuator coupled with the head for retracting in a first direction toward an outside diameter of the disk and a second direction toward an inside diameter of the disk in response to corresponding signals. A control device coupled with the actuator which is adapted for determining a retract direction for the read/write head, wherein a first signal indicative of a first direction and a second signal indicative of a second direction is provided to the actuator, the control device further providing the first signal following a loss of power which energizes the disk drive motor of the disk drive system and providing the second signal subsequent to providing the first signal for retracting the read/write head to the landing position.

BRIEF DESCRIPTION OF THE DRAWINGS

For a more complete understanding of the present invention, reference is made to the following detailed description taken in conjunction with the accompanying drawings wherein.

DETAILED DESCRIPTION

Figure 1:
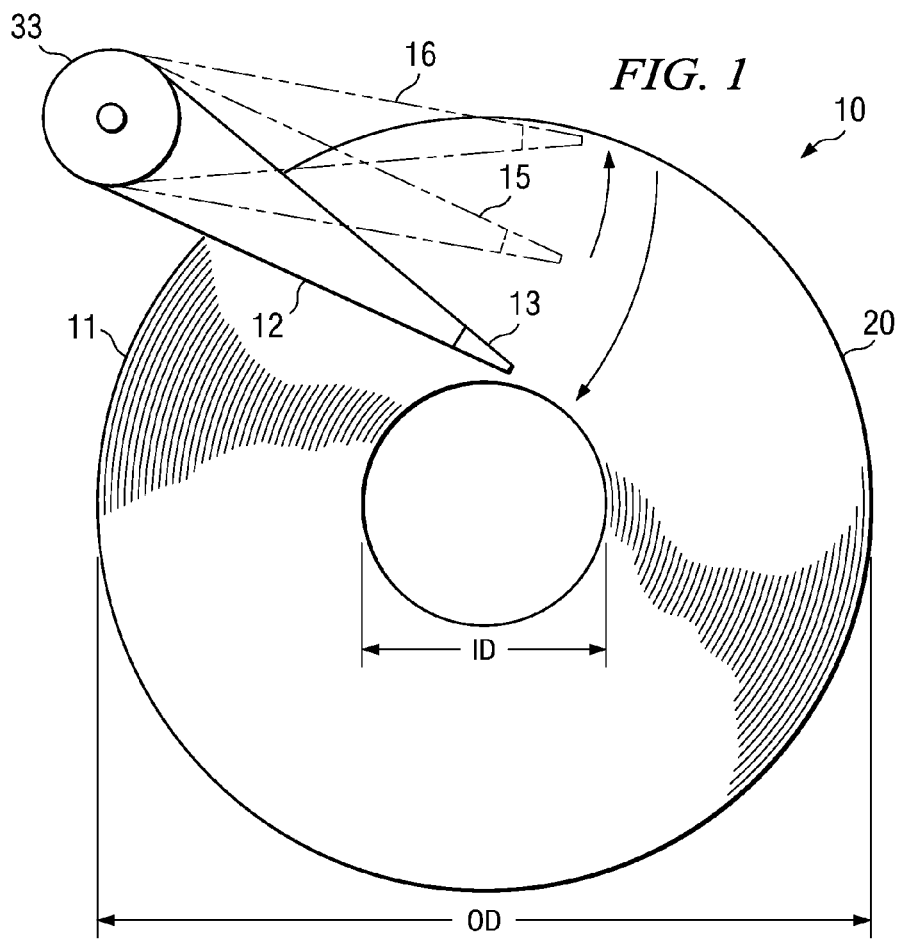
FIG. 1 shows a disk drive system which include the disk, actuator arm and read/write head for illustrating exemplary embodiments of the present invention.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others. Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

For the hard disk drives which use some number of tracks in the inner diameter (ID) of the disk to rest, the ID surface is grooved or undulated to avoid stiction of the head with the media during a start-up. In conventional practice, the head is retracted to the ID immediately after a power failure or on a software command. The motor (SPM) is then allowed to coast down to a slower speed before a brake is applied to completely stop its rotation. Typically in a drive whose rotational speed as around 10k rpm or more, it is essential to apply the braking after sufficient time has elapsed. When the braking is applied to the motor, the b-emf voltage is shorted to ground with the three parallel motor resistances. The typical value for the motor resistance per phase can be as low as 1 ohm, so with b-emf of 4 volts the braking current is large. This large current is why it is imperative to slow down the motor by allowing it to coast to a lower rpm before brake is applied. However, the retraction of the actuator is done immediately. The actuator head hence continuously faces friction with the media till the brake is applied.

A circuit for braking a polyphase dc motor, such as the SPM, includes a circuit for producing an output signal indicating that the motor has slowed at least to an actual rotational speed and a braking circuit to brake the motor when the output signal or tach signal indicates that the motor has slowed at least to an actual rotational speed.

During the coasting period, the air forces dissipate and the head comes to rest on the media surface. After the head comes in contact with the media, it typically takes approximately 2~3 seconds before the motor comes to a complete stop. During this 2~3 seconds, the head is grinding against the uneven surface of the ID.

Thus, when the head is retracted, friction is generated between the head and the uneven surface of the ID. This friction not only wears the head, it wears the uneven surface of the ID as well. Repeated retracts eventually work to smooth the uneven surface. When the ID surface is no longer uneven, the head begins to stick with the media and is unable to properly launch with the designed launch current causing long-term reliability problems.

An aspect of the present invention provides for control of the head assembly of a hard disk drive, for a retract condition, which advantageously reduces the above-mentioned friction concerns. Referring now to FIG. 1 there is shown a disk drive system 10 which includes the disk 11, actuator arm 12 and read/write head 13 for illustrating exemplary embodiments of the present invention. For example, a first position (shown in broken lines at position 15) of the actuator arm 12 illustrates a random location before a retract condition, such as a power failure, is determined. Following a determination that retraction of the head is needed, a retract command is issued to retract the head 13 toward the outer most diameter (OD) of the disk 11 (arm shown in broken lines in a second position 16 at the OD). The arm can be maintained to rest against the outer stop 20 of the actuator. At the OD, as the disk continues to rotate, the air forces still provide an air cushion for the head at the OD.

The head 13, via the actuator arm 12, is maintained at the OD (i.e., position 16) until the motor speed reaches a predetermined threshold. For example, the threshold can be determined as a percentage of a target count for conventional braking. Upon reaching the threshold, the retract direction is changes and the arm 12 and head 13 are maneuvered toward the final retract position or park position at the ID (indicated as a solid line). Once the heads are positioned over the ID, the SPM is then braked conventionally to stop its rotation as rapidly as possible, so that the time in which the head 13 may contact the disk 11 is minimized. Such braking, of course, requires additional energy. It can therefore be seen that design considerations need to be implemented to insure that a sufficient amount of b-emf is generated to move the head 13 completely to the landing strip to avoid a premature landing on an unwanted portion of the disk media. During this landing period, sufficient rotational speed of the SPM must be provided to ensure a sufficient air flow to maintain the vertical position of the head 13 while over the disk media.

The threshold, for example, can be set for 75% of the target count conventionally used for braking. The phases or phase crossings of the motor can be used to determine the timing of the brake or it can be timed from a controlled oscillator. The target count can also be determined from a measure of the b-emf. The direction of the retract can be controlled by a serial port bit in which the direction bit is made changeable upon reaching the threshold (after a specific time or crossing have been elapses, for example). In this way, a substantial amount of friction time can be avoided. This approach can result in up to approximately a 75% reduction of time the head is grinding with the media.

The time delay to apply brake to the motor is pre-determined by measuring the time elapsed from the power failure, for example. Monitoring the number of phase crossings of the motor can also do it. In order to perform such functions these parameters, which determine the time, elapsed or fix number of phase crossings has occurred, are reserved in serial port registers. These special registers are not cleared by the power failure. A very low voltage on the supply clears them, which is a VM pin. The VM pin is the place where rectified b-emf is stored on a reservoir capacitor. So this supply can be used to pre-determine the direction of the retract to the outer diameter of the disk. As the motor coasts down to a pre-determined speed or time, this direction bit can be toggled to indicate retraction in the opposite direction. So, by using the same circuitry, which is used to pre-determine the moment of brake application, we can issue the direction change for the actuator and hence save the amount of friction the head will go through otherwise. This circuitry is performed by digital gates and hence capable of operating under very low voltage and their current requirements are very close to zero.

Figure 2:
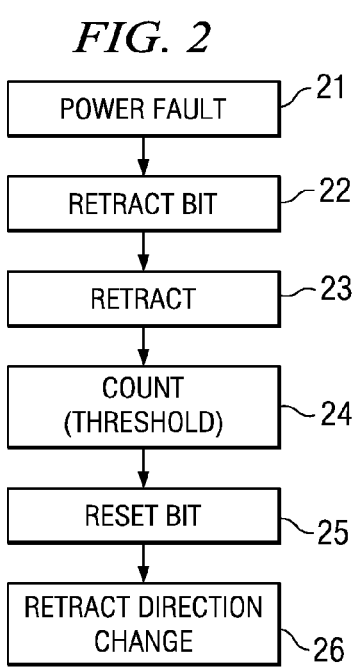
FIG. 2 illustrates a method diagram in accordance with exemplary embodiments of the present invention.

Referring now to FIG. 2 there is shown a method diagram in accordance with exemplary embodiments of the present invention. First, a power fault or command is received 21 and, responsive thereto, a retract bit is set 22 to a value indicative of a retract direction for the VCM toward the OD. Next, a retract is started 23 in a direction based on the retract bit and count begins for the brake 24. When the count reached a predetermined threshold, the retract bit is reset or changes state 25 to a value indicative of a retract direction toward the ID and retract is started 26 based on the new retract bit value.

Figure 3:
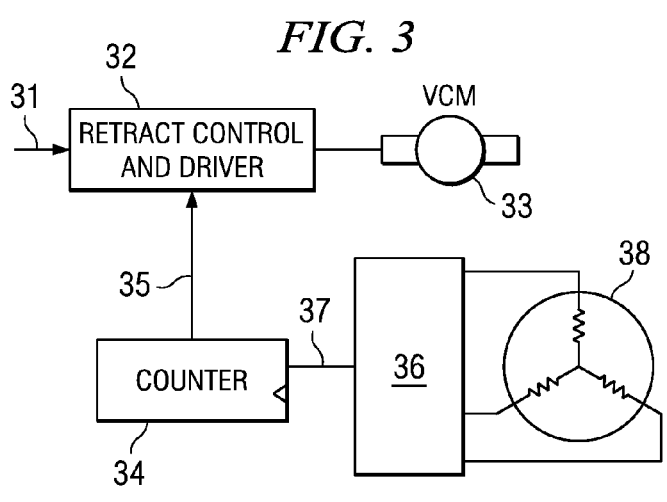
FIG. 3 illustrates a block diagram of a system for providing control of the head assembly of a hard disk drive in a retract condition according to exemplary embodiments of the present invention.

Referring now to FIG. 3 there is shown a block diagram of a system for providing control of the head assembly for a retract condition in accordance with exemplary embodiments of the present invention. A signal indicative of a retract command in received at line 31 of the retract control and driver 32. The retract control 32 is also coupled to the VCM 33 for providing a retract command which includes a direction for retract. The VCM 33 is coupled for movably controlling the actuator arm 12 (FIG. 1). The direction for retract is determined by the bit counter 34 and an indicative signal is provided at input 35. The bits indicate either retract toward the OD or the ID as above-described. The bits can be set, for example, by the a signal indicative of phase crossings of the motor or timing since a power shut down condition. The phase crossing or timing signal is determined by the signal generator 36 which is coupled with the spindle motor 18 and signals are received at the bit counter 34 at input 37. The signal generator 36 can also use other conventional methods to determine the speed of the motor for determining when to reset the bit. For example, the b-emf of the motor can be compared with a reference voltage or a clock can be used.

Although exemplary embodiments of the invention are described above in detail, this does not limit the scope of the invention, which can be practiced in a variety of embodiments.

What is claimed is:

1. A system for retracting a read/write head to a landing position of a disk in a disk drive, said system comprising:
    an actuator coupled with said read/write head for retracting said read/write head in a first direction toward an outside diameter of said disk and a second direction toward an inside diameter of said disk in response to respective signals; and
    a control device coupled with said actuator and adapted for determining a retract direction for said read/write head, wherein a first signal indicative of a first direction and a second signal indicative of a second direction are provided to said actuator, said control device further providing said first signal responsive to a power off condition and providing said second signal subsequent to providing said first signal for retracting said read/write head to said landing position,
    wherein said control device provides said second signal at a predetermined time period following said power off condition,
    wherein said control device is further adapted for comparing a predetermined reference voltage with a b-emf voltage produced by the disk drive motor of said disk drive system for producing said second signal following said power off condition.

2. A system for retracting a read/write head to a landing position of a disk in a disk drive, said system comprising:
    an actuator coupled with said read/write head for retracting said read/write head in a first direction toward an outside diameter of said disk and a second direction toward an inside diameter of said disk in response to respective signals; and
    a control device coupled with said actuator and adapted for determining a retract direction for said read/write head, wherein a first signal indicative of a first direction and a second signal indicative of a second direction are provided to said actuator, said control device further providing said first signal responsive to a power off condition and providing said second signal subsequent to providing said first signal for retracting said read/write head to said landing position,
    wherein said control device provides said second signal at a predetermined time period following said power off condition,
    wherein said control device provides said second signal at a time based on the phase crossing of the disk drive motor of said disk drive system subsequent to said power off condition.

3. The system of claim 2 further including a brake for braking said disk drive motor following retraction of said read/write head to said landing position.

4. A method for retracting a read/write head to a landing position of a disk in a disk drive system, said method comprising:
    generating a first signal indicative of a first direction following a loss of power which energizes the disk drive motor of said disk drive system and a second signal indicative of a second direction;
    retracting said read/write head in said first direction toward an outside diameter of said disk responsive to applying said first signal to an actuator coupled with said read/write head; and
    retracting said read/write head in said second direction toward an inside diameter of said disk responsive to applying said second signal to said actuator,
    further including retracting said read/write head to an outside diameter stop responsive to application of said first signal.

5. The method of claim 4 further including retracting said read/write head to said landing position on an inside diameter of said disk responsive to application of said second signal.

6. The method of claim 4 further including determining the speed of said disk drive motor following loss of power and generating said second signal based on a speed reduction.

7. The method of claim 4 further including braking said disk drive motor following retraction of said read/write head to said landing position.

8. The method of claim 4 further including providing said second signal when said disk drive motor has slowed to a predetermined speed following loss of power.

9. A method for retracting a read/write head to a landing position of a disk in a disk drive system, said method comprising:
    generating a first signal indicative of a first direction following a loss of power which energizes the disk drive motor of said disk drive system and a second signal indicative of a second direction;
    retracting said read/write head in said first direction toward an outside diameter of said disk responsive to applying said first signal to an actuator coupled with said read/write head; and
    retracting said read/write head in said second direction toward an inside,
    further including retracting said read/write head to said inside diameter following arrival of said read/write head at an outside diameter stop.

10. A method for retracting a read/write head to a landing position of a disk in a disk drive system, said method comprising:
    generating a first signal indicative of a first direction following a loss of power which energizes the disk drive motor of said disk drive system and a second signal indicative of a second direction;
    retracting said read/write head in said first direction toward an outside diameter of said disk responsive to applying said first signal to an actuator coupled with said read/write head; and
    retracting said read/write head in said second direction toward an inside,
    comparing a predetermined reference voltage with a b-emf voltage produced by said disk drive motor for determining the timing of said second signal.

11. A method for retracting a read/write head to a landing position of a disk in a disk drive system, said method comprising:
    generating a first signal indicative of a first direction following a loss of power which energizes the disk drive motor of said disk drive system and a second signal indicative of a second direction;
    retracting said read/write head in said first direction toward an outside diameter of said disk responsive to applying said first signal to an actuator coupled with said read/write head; and
    retracting said read/write head in said second direction toward an insides,
    providing said second signal at a time based on the phase crossing of said disk drive motor subsequent to loss of power.

* * * * *